Oct. 1, 1940.  F. F. FOWLE  2,216,705
OVERHEAD LINE-CONDUCTOR TAP
Filed April 29, 1938  3 Sheets-Sheet 1
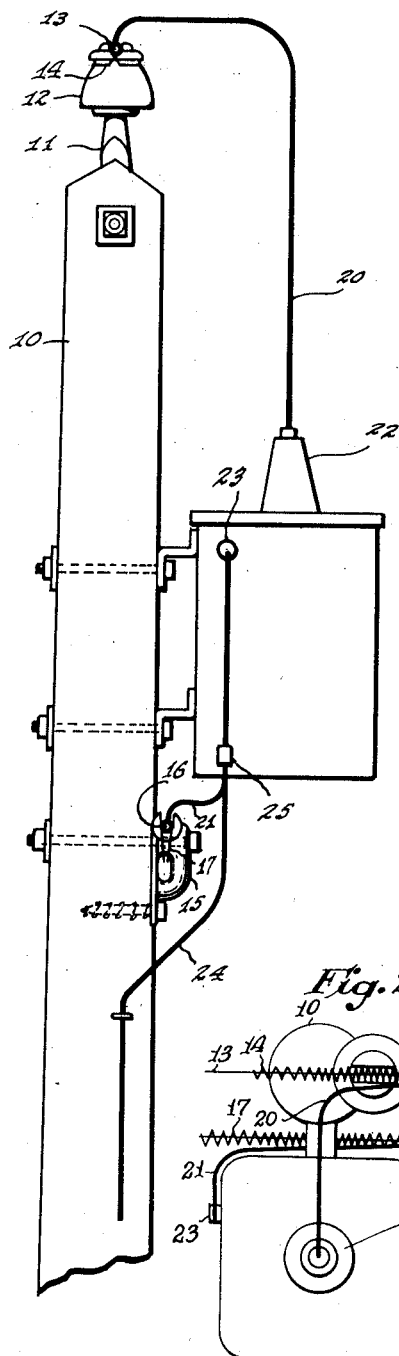
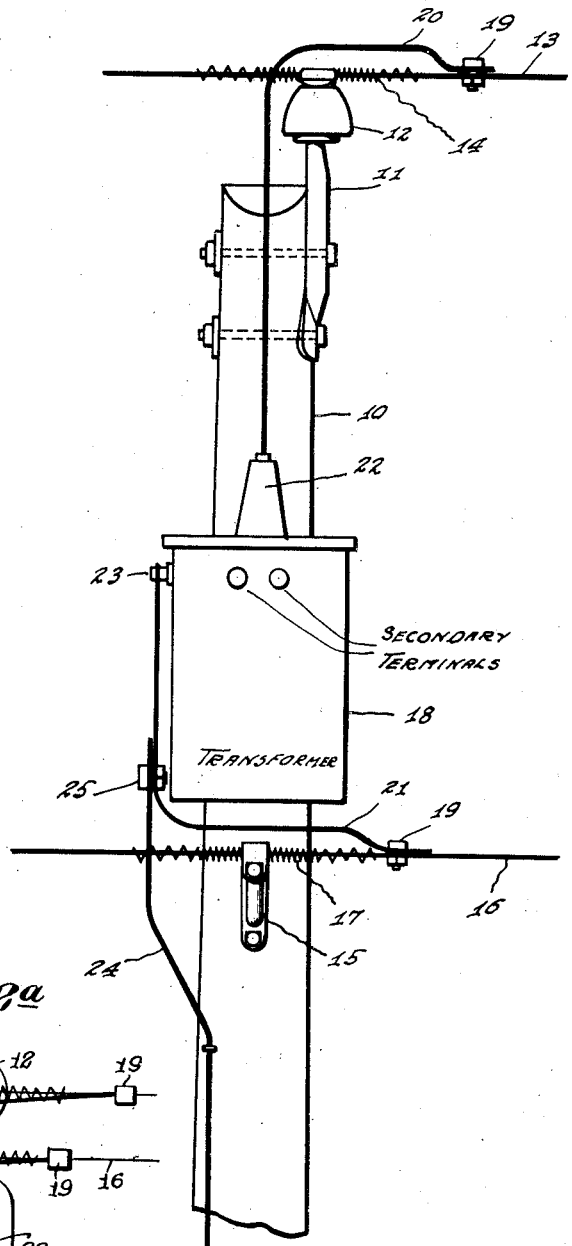
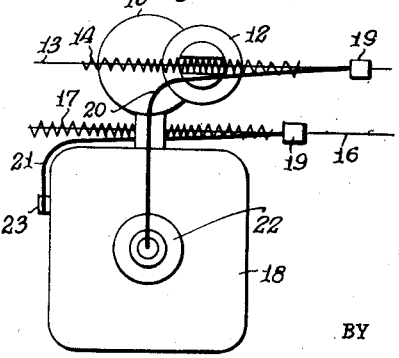
INVENTOR.
FRANK F. FOWLE,
BY
Schley & Trask
ATTORNEYS.

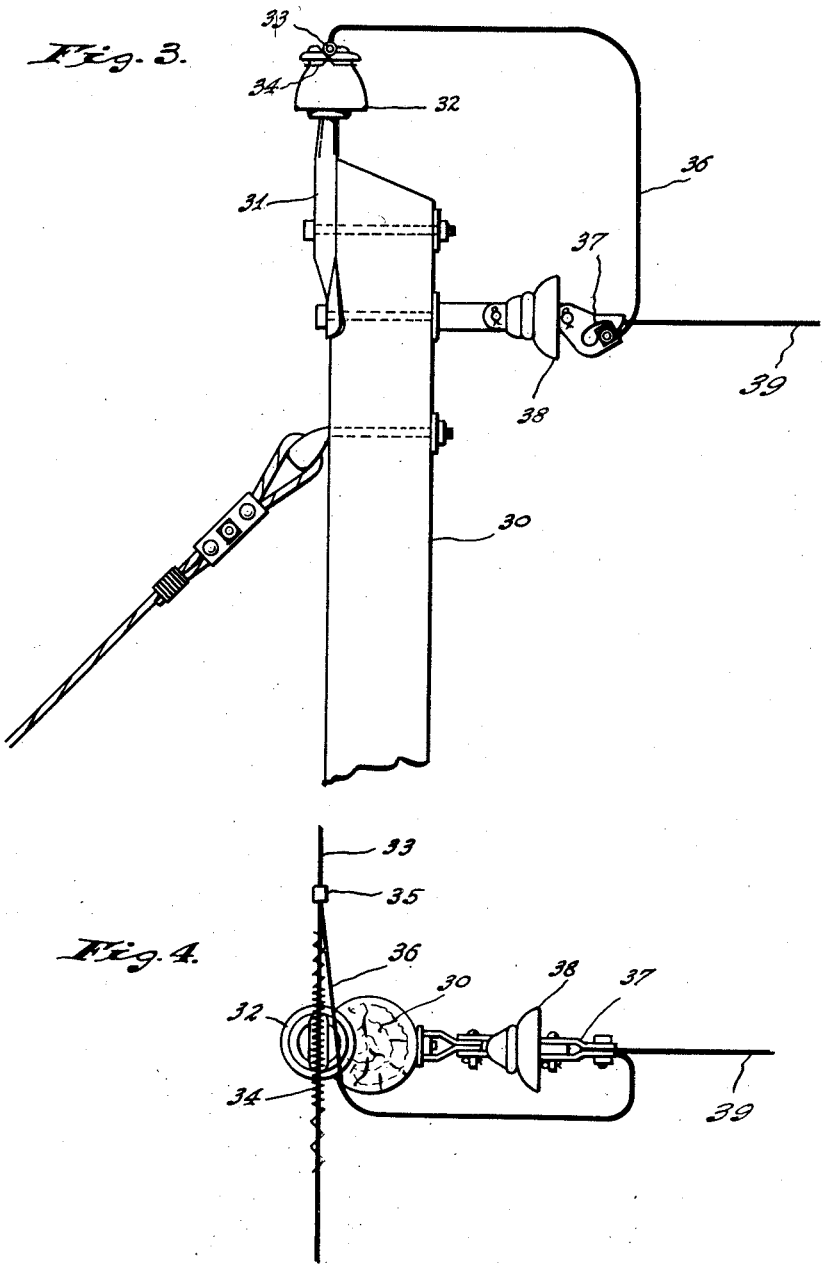

Oct. 1, 1940.　　　　F. F. FOWLE　　　　2,216,705
OVERHEAD LINE-CONDUCTOR TAP
Filed April 29, 1938　　　3 Sheets-Sheet 3
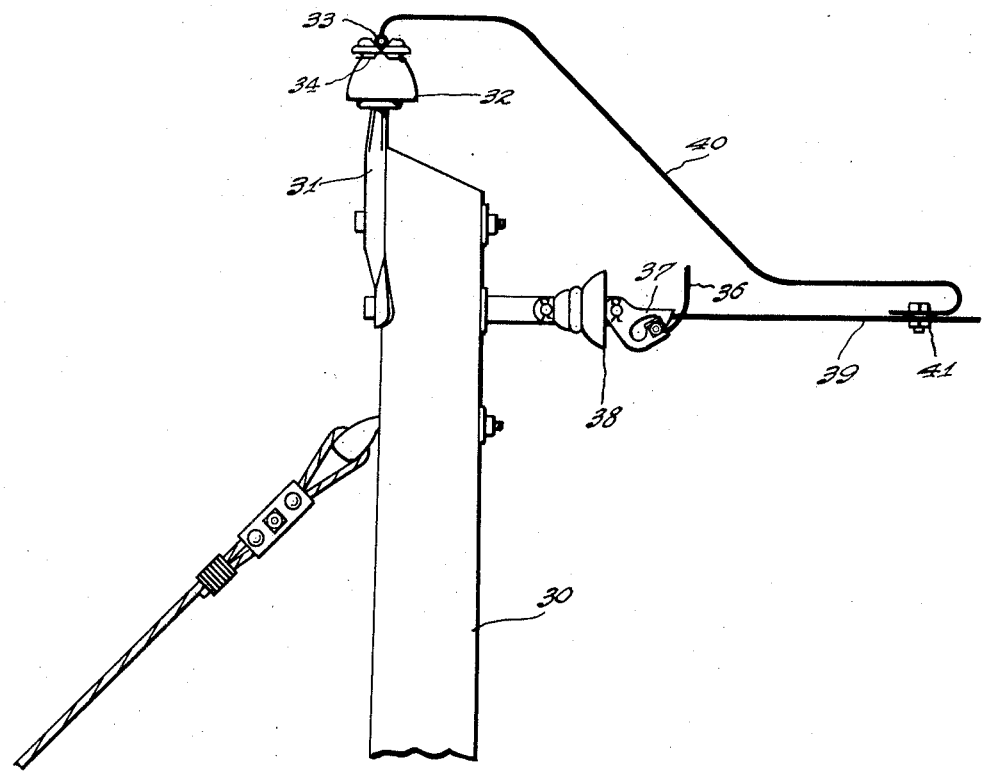
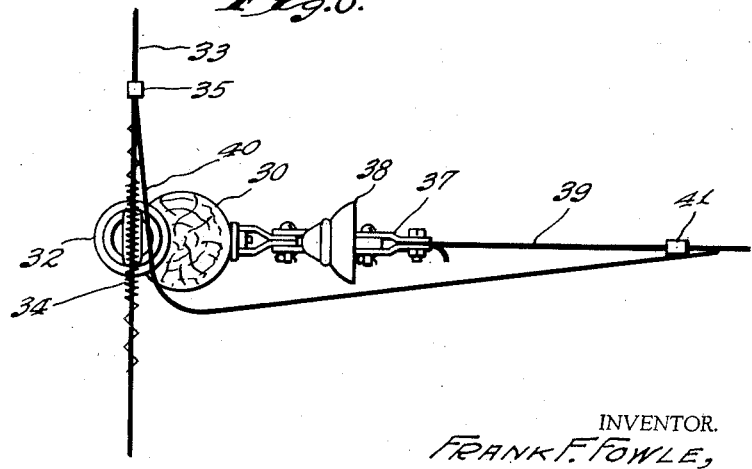
INVENTOR.
FRANK F. FOWLE,
BY
ATTORNEYS.

UNITED STATES PATENT OFFICE 2,216,705

OVERHEAD LINE-CONDUCTOR TAP

Frank F. Fowle, Winnetka, Ill., assignor to Indiana Steel & Wire Company, Muncie, Ind., a corporation of Indiana Application April 29, 1938, Serial No. 205,060

6 Claims. (Cl. 174—43)

It is the object of my invention to provide for a conductor of an overhead electric transmission line an overhead-line tap which imposes substantially no anchoring effect or restraint of movement on the conductor that would interfere with its free vibration or swaying and that would thereby tend to cause local concentration of stresses and resultant tendency to fatigue failure.

By the term "overhead electric transmission line" I mean an overhead line which has a series of conductor-spans under tension and which may be required to carry electric current; and by by the term "conductor" I include any conductor which may be required to serve as a current-carrier for an electrical system, and so not only the conductors of a transmission circuit proper but also various ancillary conductors, such as ground wires, shield wires, messenger cables, catenary supports, etc., which may be primarily for other than conducting purposes and/or may actually serve to conduct current only occasionally.

An overhead electric transmission line is of necessity supported at intervals, with spans between. At the points of support, it is customary to provide fastening devices for attaching the conductors to the supporting structures. Sometimes these fastening devices are ties which have portions that are wrapped around the conductors and extend for greater or less distance away from the actual point of support along the conductor on one or both sides thereof, as is shown in my co-pending application Serial No. 205,059, filed concurrently herewith.

It is frequently necessary to provide taps from such overhead conductors, as for connecting a branch conductor and a main conductor. This is usually done in the neighborhood of a point of support of the conductor, by a clamp which attaches the line-conductor and the tap-conductor together. The clamp is usually spaced a slight distance away from the point of support; the distance depending upon the nature of the fastening device, and sometimes being as much as a foot or even more, especially when the fastening device is a tie which extends along the conductor for a substantial distance, so that the clamp will be beyond the end of the tie-wire.

Examples of such taps are for connecting main conductors to ground wires, to branch conductors that extend at an angle away from the main line, to primary leads to a transformer, to leads to lightning arresters, and others.

In previous constructions, the tap-conductor extending from the clamp commonly has been installed not only in a haphazard manner but in a manner which tends to anchor and restrain the free movement of the conductor at the point where the clamp is located. Since a span of conductor inevitably is subject to swaying and vibration, any such anchoring or restraint of movement at such clamp tends to produce localization of stresses in the conductor at or very near that clamp, and as a result of that localization of stresses a tendency is created to cause fatigue failure of the conductor at the point of such localization. Many breakages of overhead line conductors, and also of tap conductors, have been caused as a result of this.

By my invention, I substantially eliminate such anchoring and restraint of movement, and thus substantially eliminate the localization of stresses and the resultant breakages which such localization of stresses tends to cause.

In doing this, I do away with the haphazard extension of the tap-conductor from the clamp attaching it to the line-conductor. Instead, the tap-conductor is supported only at its two ends, one of which is in the clamp, and between those supported ends has at least two main portions— first, a portion close to the clamp and extending in general parallelism with the line-conductor toward the line-conductor support, or even to or beyond it; and, second, a portion extending at a substantial angle, desirably a wide angle which preferably approaches or even reaches a right angle, from that end of the first portion which is remote from the clamp. By having a tap of this nature, the clamp is free to move as required by the vibration and swaying of the line-conductor with substantially no restraint from the tap-conductor.

The accompanying drawings illustrate my invention. In such drawings: Fig. 1 is an elevation of the upper part of a pole carrying the two line-conductors of a single-phase primary distribution line, one of said line-conductors being grounded, and a transformer the primary winding of which is supplied by tap-conductors from the two line-conductors, the line-conductors being perpendicular to the plane of the view; Fig. 2 is an elevation of the same structure shown in Fig. 1, as viewed from the side of the line; Fig. 2a is a top plan view of the structure shown in Figs. 1 and 2, with the tap connections purposely shown somewhat heavier than the line-conductors for clarity of illustration; Fig. 3 is an elevation of the upper part of a pole carrying a main line-conductor which is perpendicular to the plane of the view, and a branch line-conductor extending from the pole parallel to the plane of the view; Fig. 4 is a plan of the structure shown in Fig. 3; and Figs. 5 and 6 are views generally similar to Figs. 3 and 4, but with a jumper which is a tap-conductor for both the main-line conductor and the branch-line conductor.

In the structure shown in Figs. 1, 2, and 2a, the pole 10 has at the top a ridge-pin 11 supporting an insulator 12, which carries a conductor 13 attached to it by a tie 14; which tie is advantageously of the type shown in my aforesaid co-pending application Serial No. 205,059, and includes an armor wrapping which has a close-wound portion around the conductor proper through the support and for some distance beyond the support on both sides, with open-wound portions beyond each end of said close-wound portion. The pole 10 also has mounted on it, at a slight distance below its top, a metal bracket 15 in which is mounted a second conductor 16, which is attached to it by a tie 17; also advantageously of the type shown in my aforesaid co-pending application Serial No. 205,059, and including an armor wrapping which has a close-wound portion around the conductor proper through the support and for some distance beyond the support on both sides, with open-wound portions beyond each end of said close-wound portion. The two ties 14 and 17 extend along their respective conductors 13 and 16 for a considerable distance on each side of the conductor-supports 12 and 15.

The two conductors 13 and 16 constitute the two line-conductors of a single-phase primary distribution circuit, and they supply by tap-conductors 20 and 21 the primary winding of a transformer 18 which is also suitably mounted on the pole 10—as shown, at an intermediate height between the conductors 13 and 16.

The tap connections from the line-conductors 13 and 16 to the primary terminals of the transformer 18 are made in accordance with my invention, and exemplify that invention. To this end, each of the line-conductors 13 and 16 is provided with a clamp 19 mounted on the line-conductor beyond the end of the tie-wire wrapping. The clamp 19 in each instance clamps the free end of a tap-conductor, 20 or 21 respectively, to the line-conductor 13 or 16. Each tap-conductor 20 and 21 first extends a very short distance obliquely from the clamp 19 to obtain a slight spacing from the line-conductor 13 or 16. Then it extends substantially parallel with the line-conductor to and slightly beyond the associated line-conductor support (the insulator 12 or the bracket 15 as the case may be); to form the first main portion of the tap-conductor. In the plan view which constitutes Fig. 2a this first main portion of each tap-conductor 20 or 21 is shown at a very slight angle to the associated line-conductor, primarily for purposes of clarity, to prevent superposition of one wire over the other in the drawings, but also because exact mathematical parallelism is not essential. At a point in the neighborhood of and desirably slightly beyond such line-conductor support, the tap-conductor 20 or 21 is bent, in an unsupported curve, into its second main portion, which is substantially perpendicular to both the first main portion and the associated line-conductor 13 or 16. The tap-conductor 20 from the line-conductor 13 is so bent to extend downward to a rigid support in a high-voltage primary bushing 22 of the transformer 18, and the tap-conductor 21 from the line-conductor 16 is so bent to extend upward to a rigid support on a low-voltage primary bushing 23 of such transformer 18. A ground wire 24 that extends downward along the pole 10 to a suitable earth connection has its upper end attached, as by a clamp 25, to the vertically extending part of the tap-conductor 21, so that it imposes minimum restraint on such tap-conductor; and the upper portion of that ground wire 24 is free from the pole 10 for a considerable distance below the clamp 25.

By reason of these constructions, the line-conductors 13 and 16 are substantially free to sway and to vibrate in a normal manner without substantial interference from the attachment of the tap-conductors. That is because in such swaying and vibration, the clamps 19 may move with substantial freedom both sidewise and vertically as required by such swaying and vibration, by reason of the ease of movement of all the parts of the tap-conductor relative to each other, to the line-conductor, and to the attaching point on the pole 10; for by reason of the lengths of the tap-conductor parts which are respectively parallel to and perpendicular to the line-conductor, and the curves connecting the several parts of the tap-conductor, the force required to get the necessary relative movements of those tap-conductor parts is negligible.

In the construction shown in Figs. 3 and 4, a pole 30 carries a ridge pin 31 which at its upper end is provided with an insulator 32, in which is mounted a main line-conductor 33. The main line-conductor is attached to the insulator 32 by a tie 34 which has portions that are wrapped around said line-conductor and portions that extend for a substantial distance along such line-conductor on each side of the insulator 32, in the manner set forth in my co-pending application Serial No. 205,059. Beyond one end of the tie 34 is a clamp 35, in which is mounted the free end of a tap-conductor 36. From the clamp 35, the tap-conductor 36 first extends obliquely upward for a very short distance in much the same manner as do the tap-conductors 20 and 21 from the conductors 13 and 16 of Fig. 2. Then it extends approximately parallel (for the very slight obliqueness shown in plan in Fig. 4 is substantial parallelism) across but slightly above the insulator 32 to the far side of such insulator from the clamp 35. Then the tap-conductor 36 is bent, in a free unsupported curve in an approximately horizontal plane, and extends from such curve in a substantially horizontal plane and perpendicularly away from the line-conductor 33. In this particular embodiment of my invention, the tap-conductor is then bent in a second unsupported curve, this time in a substantially vertical plane, from which second curve the tap-conductor extends substantially vertically downward to a strain clamp 37 supported from the pole 30 through a suspension insulator 38. The tap-conductor 36 passes through the strain clamp 37, and, as the line-conductor 39 of a branch line, extends horizontally therefrom, to any desired point.

By reason of this arrangement of the tap-conductor 36 between the tap-clamp 35 and the strain clamp 37, the tap-conductor offers substantially no interference to the free movement of the clamp 35 as produced by the swaying and the vibration of the main line-conductor 33.

In the construction shown in Figs. 5 and 6, the pole 30, the ridge pin 31, the insulator 32, the main line-conductor 33, the tie 34, the tap-clamp 35, the strain clamp 37, the suspension insulator 38, and the branch line-conductor 39 are the same as in the construction shown in Figs. 3 and 4. The tap-conductor 40, however, is different in detail from the tap-conductor 36 shown in Figs. 3 and 4, chiefly in that instead of being a continuous extension through the strain clamp 37 of the branch line-conductor 39 it is a conductor which is separate from that branch line-conductor but attached thereto by a tap-clamp 41. Thus the tap-conductor 40 is a jumper, attached to the main line-conductor 33 by one tap-clamp 35, and to the branch line-conductor 39 by another tap-clamp 41. The tap-conductor 40 starts from the tap-clamp 35 on the main line-conductor 33 in much the same manner as has been described in connection with the arrangement of Figs. 3 and 4; for it first extends obliquely upward for a very short distance from the tap-clamp 35, then extends substantially parallel across but slightly above the insulator 32, and then is bent in a free unsupported curve in an approximately horizontal plane into a portion which extends from such curve substantially horizontally and perpendicularly away from the line-conductor 33. From the outer end of this last-named portion, the tap-conductor (or jumper in this case) extends obliquely downward away from the pole 30 toward the branch line-conductor 39, as is clear from Fig. 5, and then extends substantially horizontally and substantially parallel to the branch line-conductor 39 to a point (in this modification) slightly beyond the tap-clamp 41, where it is bent downward through an angle of substantially 180° into a portion which extends backward toward the pole 30 through the tap-clamp 41, by which it is attached to the branch line-conductor 39. In the arrangement shown in Figs. 5 and 6, therefore, there are two embodiments of my invention in the tap-conductor or jumper 40; for from each of the tap-clamps 35 and 41 there is a portion which extends substantially parallel to the immediately adjacent line-conductor toward the pole 30, at the remote end of which portion there is a second portion which extends at a wide angle.

I claim as my invention:

1. In an overhead line-conductor tap, the combination with an overhead line-conductor mounted on spaced supports to provide open spans, of a tap-conductor which is supported at two points and is unsupported between those two points, one of said two points being a connection to said line-conductor at a point in the neighborhood of but considerably spaced away from one of the line-conductor supports; said tap-conductor between said two supporting points including at least two main portions, of which main portions one is a portion starting close to the point of attachment to the line-conductor and extending a considerable distance in general parallelism with and close to but slightly spaced from the line-conductor between that point of attachment and the line-conductor support, and the other of which main portions is a portion extending a considerable distance at a substantial angle from that end of the first portion which is remote from the point of attachment to the line-conductor.

2. In an overhead line-conductor tap, the combination with an overhead line-conductor mounted on spaced supports to provide open spans, of a tap-conductor which is supported at two points and is unsupported between those two points, one of said two points being a connection to said line-conductor at a point in the neighborhood of but considerably spaced away from one of the line-conductor supports; said tap-conductor between said two supporting points including at least two main portions, of which main portions one is a portion starting close to the point of attachment to the line-conductor and extending a considerable distance in general parallelism with and close to but slightly spaced from the line-conductor between that point of attachment and the line-conductor support, and the other of which main portions is a portion extending a considerable distance at a substantial angle from that end of the first portion which is remote from the point of attachment to the line-conductor.

3. In an overhead line-conductor tap, the combination as set forth in claim 1, with the addition that said substantial angle is a wide angle.

4. In an overhead line-conductor tap, the combination as set forth in claim 1, with the addition that said substantial angle is substantially a right angle.

5. In an overhead line-conductor tap, the combination as set forth in claim 1, with the addition that there are ties which fasten said overhead line-conductor to its supports and which extend outward along the line-conductor from said supports, and that the point of attachment of the tap-conductor to the line-conductor is slightly beyond the end of one of said ties.

6. In an overhead line-conductor tap, the combination as set forth in claim 1, with the addition that there are ties which fasten said overhead-line conductor to its support and extend outward along the line-conductor from said support, and which include a close-wound wrapping portion on the line-conductor through the support and for some distance on both sides thereof and an open-wound portion beyond an end of said close-wound portion, and that the point of attachment of the tap-conductor to the line-conductor is slightly beyond the end of that open-wound portion of the tie.

FRANK F. FOWLE.